United States Patent [19]

Forge

[11] 4,135,234

[45] Jan. 16, 1979

[54] SATURABLE REACTOR SWITCH CONTROL FOR SWITCHING REGULATOR POWER SUPPLIES

[75] Inventor: Charles O. Forge, Los Altos, Calif.

[73] Assignee: Boschert Associates, Sunnyvale, Calif.

[21] Appl. No.: 876,342

[22] Filed: Feb. 9, 1978

[51] Int. Cl.² ............................................. H02M 3/335
[52] U.S. Cl. .......................................... 363/21; 363/97; 363/124; 323/DIG. 1
[58] Field of Search .................... 363/20, 21, 75, 91, 363/93, 124, 97; 323/4, 17, DIG. 1

[56] References Cited

U.S. PATENT DOCUMENTS

| | | | |
|---|---|---|---|
| 3,436,644 | 4/1969 | Murray et al. | 363/97 |
| 3,624,405 | 11/1971 | Bishop et al. | 323/83 X |
| 3,986,052 | 10/1976 | Hunter | 323/17 X |

*Primary Examiner*—A. D. Pellinen
*Assistant Examiner*—Peter S. Wong
*Attorney, Agent, or Firm*—Linval B. Castle

[57] ABSTRACT

Pulsewidth determining circuitry for switching regulator power supplies employs a saturable reactor current comparator that controls a circuit that switches off the primary current whenever it instantaneously exceeds a value dependent upon a control signal derived from the power supply D.C. output level.

6 Claims, 2 Drawing Figures

SATURABLE REACTOR SWITCH CONTROL FOR SWITCHING REGULATOR POWER SUPPLIES

SUMMARY OF THE INVENTION

Recent power supply improvements include the development of the highly efficient switching regulator power supplies which dissipate a minimum of electrical power and therefore obviate the need for the complex cooling schemes normally required by the more conventional regulators that operate by dissipating substantial amounts of power to achieve the desired output level. Switching regulators are generally voltage regulating circuits which sample the regulator output voltage, compare it with the voltage reference, and use the error voltage to control the on-time to off-time ratio of an electronic switch in series between an unregulated D.C. source and either a series inductor or the primary winding of the regulator transformer, the secondary winding of which is coupled to rectifying circuits which provide the regulator D.C. output voltage.

The switch in series with the power source and the transformer primary winding produces pulsed D.C. which is readily transformed into the secondary winding of the transformer. The width of the pulses produced by the action of the series switch determines the level of output voltage produced by the supply.

There are two basic types of pulsewidth determining methods used to determine the "ON" time of the series switch. One type employs a timing circuit that predetermines the "ON" time to a value dependent upon a D.C. control signal as described in U.S. Pat. No. 4,037,271 to Keller. The second basic pulsewidth determining method employs a current comparator circuit that immediately switches the primary current off when it instantaneously exceeds a value dependent upon a D.C. control signal.

Briefly described, the circuitry of the invention includes a three-winding saturable current sensing transformer having a control winding through which flows a saturating D.C. control signal dependent upon the power supply output voltage level. When current flows and builds up in the regulator primary circuit and through a second winding in series with the switching transistor, the saturating effect of the control signal will be overcome and the transformer becomes effective and induces a signal into a third winding that instantaneously turns off the switching transistor, thereby cutting off the flow of primary current until re-started by a pulse originating from a trigger oscillator.

DESCRIPTION OF THE DRAWINGS

In the drawings which illustrate a preferred embodiment of the invention.

DETAILED DESCRIPTION OF THE PREFERRED EMBODIMENT

In switching regulator power supplies, unregulated D.C. is rapidly switched on and off to produce a pulsed D.C. that is applied to the primary winding of a transformer, the secondary of which is coupled to appropriate rectifying and filtering circuitry. In most supplies of this type, the filtered D.C. output voltage is sampled and compared with a reference voltage to produce an error signal that controls the operation of the switch in the primary circuit. As prevously mentioned, this may be done by controlling a switch timing circuit that determines the "ON" time of the switch. In the circuitry to be described herein, the switch is turned on at a constant predetermined rate and turned off when the primary current through a current comparator instantaneously overcomes and exceeds a level of saturation produced by and depended upon the D.C. output level of the power supply.

Figure 1:
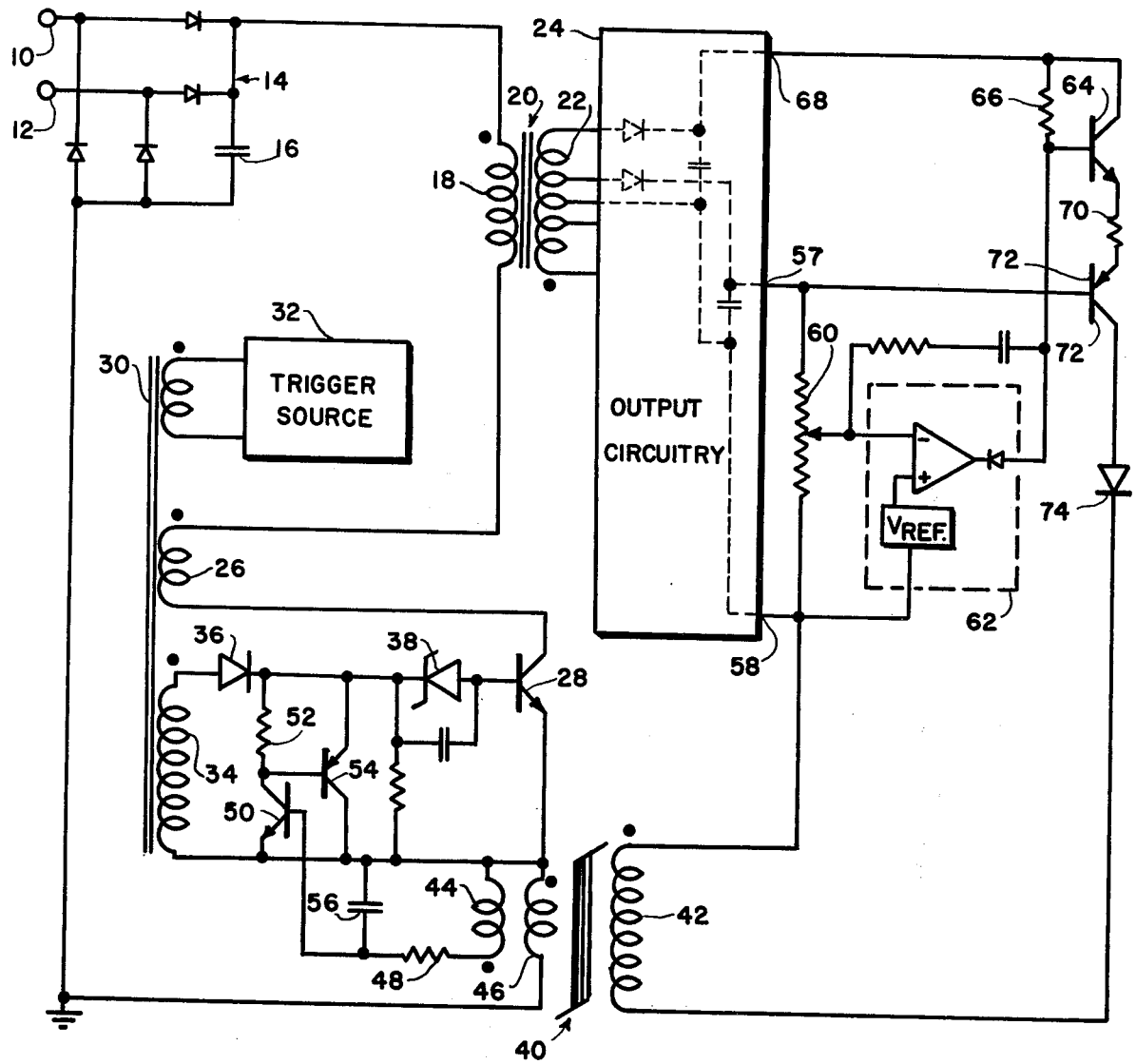
FIG. 1 is an electrical schematic drawing illustrating the switching regulator circuitry of the invention.

In FIG. 1, A.C. applied to the input terminals 10 and 12, is rectified and filtered by the bridge rectifier circuit 14 and capacitor 16 into unregulated D.C. The positive terminal of the bridge 14 is coupled to one end of the primary winding 18 of the power supply transformer 20, the secondary windings 22 of which are applied to typical output circuitry 24 which includes conventional rectifying and filtering components as partially shown by dashed lines in the drawing.

The second end of the transformer primary winding 18 is applied through a winding 26 to the collector of an NPN switching transistor 28. Winding 26 contains approximately six turns on a current transformer 30 which, as will be subsequently described, provides a regenerative base current to the transistor 28. Also inductively coupled to the current transformer 30 is a trigger source 32 which preferably provides a 20 KHz signal that turns on transistor 28 at that trigger rate. The emitter of transistor 28 is coupled to one end of a winding 34 on the transformer 30, the other winding end of which is connected to the anode of a diode 36, the cathode of which is coupled through a 5.1 volt Zener diode 38 to the base of the transistor 28. Thus, regenerative signals produced by the winding 26, or starting signals produced by the trigger source 32, will operate to render the transistor 28 conductive.

The switching circuitry that includes the switching transistor 28 is controlled by a current comparator circuit that includes a current-sensing element 40 comprising a transformer core having three windings 42, 44 and 46. In the preferred embodiment, winding 42 contains seventy turns and windings 44 and 46 have seven turns around the core of element 40. Winding 46 is connected between the emitter of the switching transistor 28 and ground reference and therefore must be of a size suitable to carry all of the primary current of the power supply.

One end of winding 44 of the sensing element 40 is coupled to the emitter of transistor 28 and the second end of the winding is coupled through a resistor 48 to the base of an NPN transistor 50. The emitter of transistor 50 is coupled to the emitter of transistor 28 and the collector of transistor 50 is coupled through a resistor 52 to the cathode of diode 36. The collector of transistor 50 is also coupled to the base of a PNP transistor 54, the collector of which is coupled to the emitter of transistor 28 and the emitter of which is coupled to the cathode of diode 36. Coupled between the base and emitter of transistor 50 is a capacitor 56. As will be subsequently described pulses induced in the winding 44 of the sensing element 40 are delayed by the RC circuit comprising resistance 48 and capacitor 56 and are applied to the base of transistor 50 to render that transistor conductive, thereby turning on transistor 54 and shutting off the switching transistor 28.

An output error signal is derived by sampling the voltage output of the output circuitry 24 which is presumed to produce, inter alia, positive output voltages of 5 volts and 12 volts. Coupled between the 5-volt output terminal 57 and the common terminal 58 is a potentiometer 60 having a value of approximately 100K. The center arm of potentiometer 60 is coupled to the input terminal of a shunt regulator 62, which is preferably a type TL430 manufactured by Texas Instruments Company. The output of the shunt regulator 62 is connected to the base of an NPN transistor 64 and also through a resistor 66 to the 12-volt terminal 68 of the output circuitry 24. The collector of transistor 64 is also coupled to the 12-volt output terminal 68 and the emitter is coupled through a 14-ohm resistor 70 to the emitter of a PNP transistor 72, the base of which is coupled to the 5-volt output terminal 57 and the collector of which is coupled through a diode 74 to one side of winding 42 of the current sensing element 40. The opposite side of winding 42 is connected to the common terminal 58 of the output circuitry 24.

OPERATION OF THE CIRCUITRY

The shunt regulator 62 includes error signal circuitry in which a reference voltage source is compared with the voltage level selected by the position of the movable arm of potentiometer 60 so that any increase in voltage at the output terminal 57 will result in a decrease in the conductivity through transistor 64. The PNP transistor 72 is connected in a common base configuration so its collector port impedance will be high and the diode 74 will allow recovery transient of the current sensing element 40 to exist across the winding 42 without forward biasing the transistor 72 collector junction during start-up. The 14-ohm resistor 70, between the emitters of transistors 64 and 72, provides current limiting and fold-back since the control current, and hence the switch current, inductor current, and the load current, is limited by the output voltage divided by 14 ohms.

Figure 2:
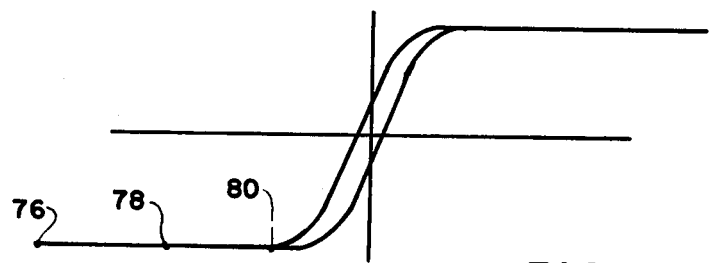
FIG. 2 is a B-H curve for illustrating the operation of the circuitry in FIG. 1.

The D.C. control current produced in the error signal circuitry is applied through winding 42 of the current sensing element 40 and biases the core of element 40 far into saturation, for example, to point 76 in the B-H curve of FIG. 2. At this point, the transformer action between windings 44 and 46 is poor because the saturated core has an incremental permeability that is essentially that of air and therefore the shunt primary inductance is very low.

When switching transistor 28 is triggered on by the action of the trigger source 32, collector current starts to flow through winding 46 and since the direction of flow of the collector current is opposite to that of the control current, the operating point on the B-H loop moves toward the point 78. As the collector current of switching transistor 28 increases further, the magnetizing force from the winding 46 will eventually approach a balance with that from the control winding 42, as shown by the point 80 of FIG. 2. As the primary current further increases, the operating point moves across the "linear" portion of the B-H loop and the current-sensing element 40 becomes an effective transformer. The winding 42 is not loaded since it faces a current source of high impedance. The winding 44 therefore becomes a secondary winding and all further incremental current from the point 80 of FIG. 2 becomes applied to the base of the transistor 50, thereby turning on transistor 50 and transistor 54, and turning off the switching transistor 28.

When transistor 54 saturates, the 5.1 volt Zener voltage across the Zener diode 38 is applied to the base of switching transistor 28 assuring reverse biased turn-off to transistor 28.

As previously mentioned, resistor 48 and the capacitor 56 filter and delay the drive from the current-sensing element 40 to transistor 50. This filtering is necessary for two important reasons. The first is that at start-up, when control current through winding 42 is zero, the delay provides a definite minimum pulsewidth which provides the output voltage from which control current can be derived. Secondly, because of output diode storage and capacitance, and also because of the leakage inductance of the transformer 20, the primary current waveform can have initial overshoot in certain applications and would cause immediate switch turnoff in the absence of the RC filter.

Having thus described my invention, what is claimed is:

1. In a switching regulator power supply having a variable switch for pulsing unregulated input D.C., means responsive to said pulsed D.C. for rectifying and producing desired D.C. output voltages, and control circuitry responsive to the level of at least one of said output voltages for controlling the on-time of said variable switch, said control circuitry comprising:
   a current sensing element having first, second, and third windings on a saturable core, said first winding being in series with said variable switch;
   control current generating circuitry responsive to the D.C. output voltage level of said power supply and coupled to said second winding for producing a D.C. current for saturation of said current sensing element core; and
   switch triggering circuitry coupled to said third winding for turning off said variable switch when the current in said first winding overcomes the saturation of said core.

2. The circuitry claimed in claim 1 wherein the current in said first winding generates a core magnetizing flux opposite to that produced by the control current in said second winding.

3. The circuitry claimed in claim 2 further including trigger circuitry coupled to said variable switch for turning on said switch at a preselected rate.

4. The circuitry claimed in claim 2 wherein said variable switch is a switching transistor and said trigger circuitry is inductively coupled to the base of said transistor.

5. The circuitry claimed in claim 3 wherein said control current generating circuitry includes a transistor coupled between a regulated D.C. output terminal of said power supply and said second winding, and further includes error signal circuitry for generating an output signal dependent upon differences between a second regulated D.C. output level and a predetermined reference voltage, said error signal circuitry being coupled to said transistor for controlling the current therethrough.

6. The circuitry claimed in claim 5 wherein said control current generating circuit further includes a current limiting and fold-back resistance in series between said transistor and said second winding.

* * * * *